United States Patent Office 3,473,739
Patented Oct. 21, 1969

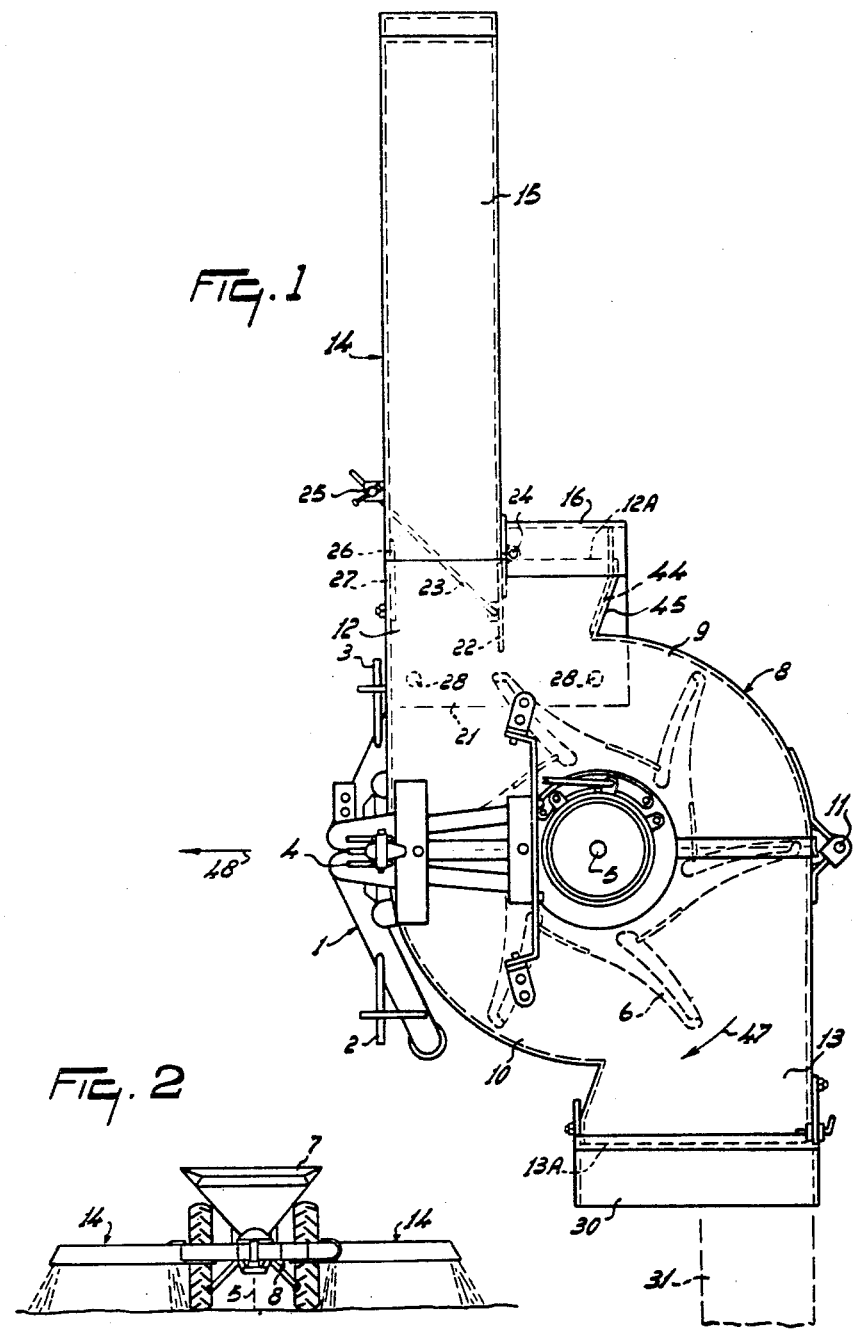

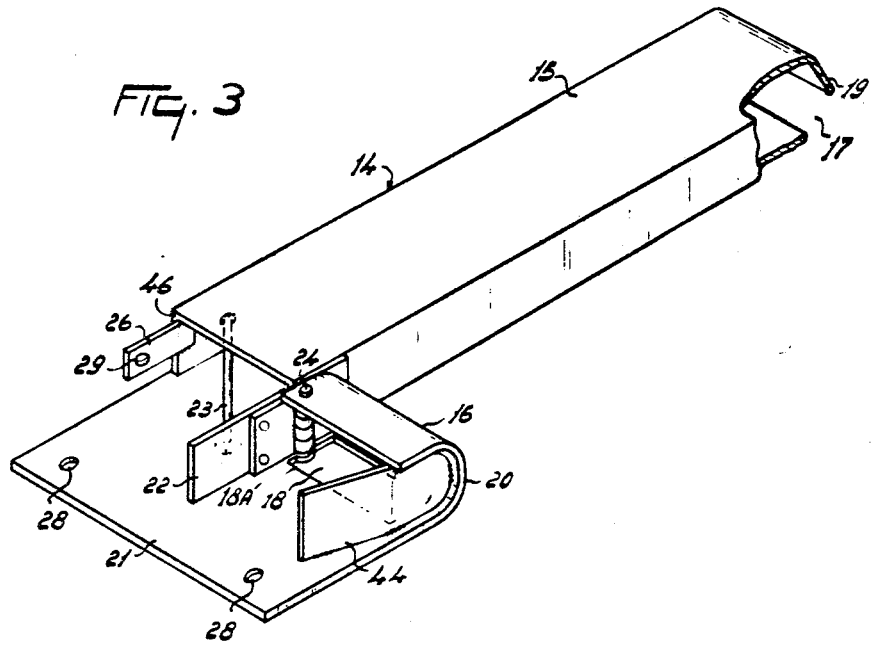
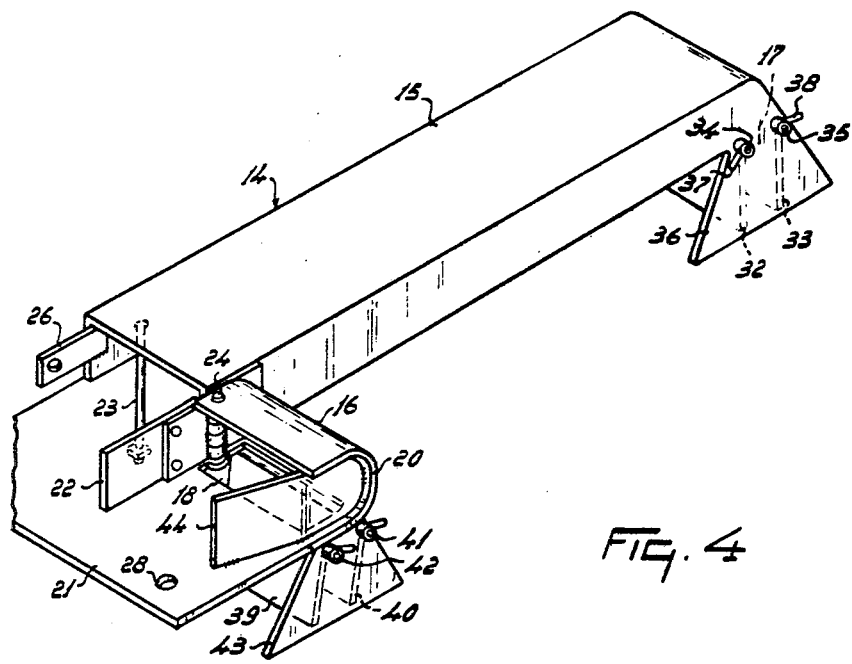

3,473,739
DEVICE FOR SPREADING GRANULAR OR POWDERY MATERIAL
Henry Lavon Singleton, Conway, S.C., assignor to The Lely Corp., Lincoln, Del., a corporation of Delaware
Filed Mar. 29, 1966, Ser. No. 538,345
Int. Cl. A01c 3/06, 17/00
U.S. Cl. 239—664                    12 Claims

ABSTRACT OF THE DISCLOSURE

The invention relates to a device for spreading granular or powdery material, comprising a hopper for said material, a rotatable spreading member arranged beneath said hopper to spread said material, a spreading hood being associated with said spreading member to direct the material spread by said spreading member into at least one stream. The hood includes one or more distributing members having a plurality of outlets for directing a stream of the material in a direction transverse to the direction of travel.

---

In the known devices of this kind the spreading hood serves to spread the material in a defined manner on a given surface.

According to the invention the hood comprises at least one distributing member through which one of said streams is directed in a direction transverse to the direction of travel of the device, said member having at least two outlet ports for said material.

For a better understanding of the invention and to show how the same way be carried into effect, reference will now be made by way of example to the accompanying drawing, which shows two embodiments.

FIGURE 1 is a plan view of part of the device and of the spreading hood attached thereto, provided with a distributing member FIGURE 2 shows on a reduced scale a rear view of the device shown in FIG. 1.

FIGURE 3 is a perspective view of a distributing member.

FIGURE 4 is a perspective view of a second embodiment of a distributing member.

The device shown in FIGURES 1–3 has a frame 1 which is provided with coupling members 2, 3 and 4, by which the device can be hitched to the three-point lift of a tractor or a similar vehicle. The device comprises a spreading member 6, adapted to rotate about an axis 5 and is arranged beneath a hopper 7 (FIG. 2) and is supported on the frame 1. The spreading member 6 is surrounded by a spreading hood 8, consisting of two portions 9 and 10, joining each other along a vertical plane going through the rotary axis 5 of the spreading member and located in the direction of travel. The portions 9 and 10 are adapted to pivot relatively to each other about a vertical axle 11 and can be fixed relatively to each other in the position shown in FIG. 1. The means for fixing said portions relatively to each other are not shown in the figures. The spreading hood 8 has two distributing ports 12A and 13A, formed by the ends of short distributing spouts 12 and 13, extending in opposite directions at right angles to the traveling direction 48 of the device. The distributing spouts join a circular portion of the spreading hood 8, which surrounds the spreading member and joins the imaginary circle traced by the ends of the distributing arms of the spreading member.

Near the distributing port 12A there is arranged a distributing member 14, which is shown in detail in FIG. 3. The distributing member 14 comprises two dividing parts 15 and 16, which extend parallel to each other and engage each other. The dividing parts 15 and 16 are at right angles to the traveling direction 48 of the device. The dividing part 15 is formed by a rectangular-section duct, provided near the lower end with a distributing port 17. The dividing part 16 is formed by a short cylindrical part, having near its lower end a distributing port 18. The distributing ports 17 and 18 are of the same size. The distributing port 18 has a rim 18A, which approximately coincides at the junction with the spreading hood with a rim of the distributing spout 12, forming the distributing port 12A. The dividing part 15 is provided near the port 17 with a fixed guide blade 19, which extends obliquely in downward direction so that it is orientated in downward direction away from the axis 5 of the spreading member. The dividing part 16 is provided with a fixed, curved guide blade 20, the lower end of which extends in downward direction towards the axis 5. The guide blades 19 and 20 form the ends of the dividing parts 15 and 16 and determine the direction of spreading of the material. The mouth of the distributing member 14, formed by the inlet ports of the dividing parts 15 and 16 joins by a rim 46 the circumferential rim of part of the distributing spout 12. The dividing part 16 is provided with a stationary, plate-shaped portion 44, which engages the oblique side 45 on the inner side of the spout 12 in front of the distributing port 12A. The distributing member 14 is provided at the inlet with a plate 21, which engages the lower side of the distributing spout 12.

Between the dividing parts 15 and 16 a pivotable dividing slide 22 is provided at the inlet port, which slide can be fixed in a plurality of positions by means of an arm 23. The dividing slide 22 is adapted to be turned about a vertical axle 24. The arm 23 can be fixed in a plurality of positions by means of a lock bolt 25.

A tag 26 on the dividing part 15 engages the side 27 inside the distributing spout 12, when the distributing member 14 is arranged on the distributing spout 12. The distributing member 14 can be fastened to the spout 12 by means of bolts, taken through the holes 28 in the plate 21. The bolts to be taken through the holes 28 can be screwed into a tapped hole in the lower side of the distributing spout 12. The tag 26 is provided with a hole 29, which may be a tapped hole. The distributing member 14 may be fixed in position by a third bolt, which is taken through a hole in the wall 27 and can be screwed into the hole 29. The wall 45 may have a hole registering with the hole in the wall 27, so that the bolt can be inserted into the hole 29. The registering holes in the walls 27 and 45 may be used for providing the distributing spout 12 with a blade for determining the spreading direction, adapted to turn about a horizontal axis, for example, the blade 30 on the distributing spout 13 (FIG. 1). The distributing spout 13 may be provided with a distributing member 31, which is shown only partly by broken lines and which is of the same structure as the distributing member 14. In order to fasten the distributing member 31 to the spout 13, the orientating blade 30 can be detached from the spout 13. The distributing members are exchangeable with the orientating blades, for example, the blade 30.

In operation the spreading member 6 is caused to rotate in the direction of the arrow 47. From the hopper 7 the material is fed to the spreading member 6 and thus through the distributing spouts 12 and 13 and the distributing ports 12A and 13A to the distributing members 14 and 31. From the distributing ports 17 and 18 of the distributing member 14 and the corresponding distributing ports of the distributing member 31 the material is spread over the surface concerned so that it is deposited on the ground in four separated paths, which is illustrated in FIG. 2. The distances between the distributing ports of the distributing arms are not equal to each other in the embodiment shown. In order to obtain equidistant paths of distribution of the material, as is indicated in the embodiment, the guide blade 19 is arranged so that the material is conducted away along said blade through the distributing port 17 obliquely downwards in a direction away from the rotary axis 5, whereas the guide blade 20 is curved so that, as is illustrated in FIG. 2, the material flows away through the port 18 obliquely downwards in a direction towards the axis 5. It will be obvious that the guide blades 19 and 20, rigidly secured to the distributing member 14 and the corresponding guide blades on the distributing member 31 may be attached in a different way to the distributing members concerned in order to determine the direction of spreading of the material through the distributing ports of the distributing members. As an alternative the distances between the distributing ports may be varied by varying the length of the distributing members. In this way the distances between the paths of the deposited material can be determined.

The provision of the distributing members 14 and 31 permits of spreading the material on four paths. In the absence of the distributing members 14 and 31 the material is spread through the distributing ports 12A and 13A on only two separate paths. The distributing members 14 and 31 thus permit in a simple manner and by simple means of varying the mode of spreading of the material. The distributing members 14 and 31 are particularly suitable for spreading material, for example, artificial manure on fields with row crop.

Without the distributing members 14 and 31 the device may be employed for spreading material, for example, artificial manure on two paths spaced apart from each other by a greater distance. The device having the distributing members is particularly suitable for use in groundnut cultures, where the space between the rows is, on an average, 90 cms., while this space may vary between 75 cms. and 110 cms. It is thus advantageous that the distance between the paths of spreading is variable.

FIGURE 4 shows a further embodiment of a distributing member near the distributing ports of which adjustable, orientating guide blades are arranged. The embodiment shown in FIG. 4 comprises parts which are designated by the same reference numerals as far as they correspond with the parts of FIG. 3. Near the port 17 two adjustable guide blades 32 and 33 are provided, which are adapted to be pivoted about horizontal axles 34 and 35. The guide blades 32 and 33 are arranged between plates 36 on the sides of the dividing part 15, the rotary axles 34 and 35 being journalled in said plates. The axles 34 and 35 are provided with nuts 37 and 38 with handles so that a turn of the guide blades 32 and 33 around the axles can be avoided by tightening the guide blades between the plates on either side of the dividing part 15. Near the opening 18 adjustable and fixable guide blades 39 and 40 are arranged as is described for the guide blades 32 and 33. Said blades can also be fixed in a plurality of positions by means of nuts 41 and 42, provided with handles. The guide blades 39 and 40 are located between a plate 43 and a corresponding plate arranged on the other side of the port 18 on the dividing part 16. When the guide blades 32 and 33 are orientated perpendicularly downwards, as is shown in FIG. 4, the material flows from the port 17 perpendicularly downwards. The width of the path of deposition of the material may be varied, for example, by swinging the guide blades 32 and 33 so that they are further spaced apart on the lower side than on the upper side. When the guide blades 32 and 33 diverge in downward direction, the material emanating from the distributing port 17 is distributed between the blades so that it is deposited in a wider path on the ground.

In the embodiment shown in FIG. 4 the guide blades 39 and 40 are slightly oblique to the vertical so that the material emanating from the port 18 is conducted obliquely downwards in a direction towards the axis 5. The width of the path on which the material is spread may be reduced by orientating the guide blades, for example, the guide blades 32, 33, 39 and 40, with their lower ends towards each other so that only a narrow gap is left between the guide blades concerned.

Although in this embodiment the distributing members, for example, the distributing member 14, are provided with only two parallel dividing parts, they may, as an alternative, have more than two dividing parts with a corresponding number of distributing ports. The number of paths of deposition of the material can be varied accordingly.

By displacing the blade 22 (FIGS. 3 and 4) the quantity of material fed to the distributing member 14 can be divided at will between the two dividing parts 15 and 16. If it is desired to spread equal quantities of material on each path, the blade 22 is disposed so that equal quantities of material are fed to the dividing parts 15 and 16. The blade 22 may, however, be fixed in such a position that for example, the dividing part 15 receives a greater quantity of material than the dividing part 16. Then a correspondingly greater quantity of material will be conducted away through the port 17 than through the port 18.

What we claim is:

1. A device for spreading granular or powdery material comprising a hopper for said material, a spreading member rotatable about a substantially vertical axis, said spreading member being arranged beneath said hopper and a spreading hood being situated around the circumference of said spreading member, said spreading hood having two outlet spouts extending in opposite direction from said hood, distributing means being detachably connected to each of said spouts, said distributing means being enclosed with sides and dividing said spouts into a plurality of outlets arranged side-by-side whereby a stream of material ejected by said spreading member is separated by a dividing side of said distributing means, each of said outlets being spaced at different distances from said spreading member and said outlets being provided with guide means.

2. A device as claimed in claim 1, wherein the outlets of said distributing means are substantially equally sized and located in the bottom side of said distributing means.

3. A device as claimed in claim 1, wherein said distributing means is divided into a plurality of divided sections of unequal lengths adjacent and parallel to each other, the number of divided sections being equal to the number of outlets of said distributing means.

4. A device as claimed in claim 1, wherein said hood engages the entrance of said distributing means, a dividing slide mounted adjacent said entrance for dividing said entrance into two portions, said slide forming an extention of said dividing side of the distributing means.

5. A device as claimed in claim 4, wherein said dividing slide is adjustable and fixable in a plurality of positions to vary the amount of material fed to each outlet.

6. A device as claimed in claim 1, wherein said guide means includes guide blades rigidly secured to said distributing means.

7. A device as claimed in claim 1, wherein said guide means comprises guide blades which are adjustably mounted on said distributing means to vary the width of the flow of material being spread.

8. A device as claimed in claim 7, wherein a guide blade adjacent one outlet is orientated in a direction differing from that of a guide blade adjacent another outlet.

9. A device as claimed in claim 1, wherein said hood is comprised of two portions hinged to one another and each portion has a distributing member connected thereto, said distributing members extending in opposite directions.

10. A device for spreading granular or powdery material comprising a hopper for said material, a spreading member rotatable about a substantially vertical axis, said spreading member being arranged beneath said hopper and a spreading hood being situated around the circumference of said spreading member, said spreading hood having two outlet spouts extending in opposite direction from said hood, distributing means being detachably connected to each of said spouts, each of said distributing means being enclosed by sides and divided into two parts of different lengths by one of said sides, said parts having outlets in their bottom sides at their outer ends and said outlets being provided with guide means.

11. A device as claimed in claim 10, wherein said guide means includes blades which are adjustable and fixable in any one of a number of settings.

12. A device for spreading granular or powdery material comprising a hopper for said material, a spreading member rotatable about a substantially vertical axis, said spreading member being situated within a spreading hood, said hood having portions extending above and below said spreading member, said portions being connected to one another by vertical walls extending around the circumference of the spreading member, two horizontally-extending outlet spouts being included in said hood, said spouts extending in opposite directions transverse to the direction of travel of the device, distributing members being detachably connected to said outlet spouts, each distributing member having two enclosed sections of different lengths separated from one another by a common side, outlets being provided in each section at the end thereof, an adjustable dividing slide positioned in front of said common side and between the two sections near said outlet spouts into the said sections.

References Cited

UNITED STATES PATENTS

| 2,500,681 | 3/1950 | Hoffstetter | 239—664 |
| 2,647,756 | 8/1953 | Allersma | 239—664 |
| 3,331,607 | 7/1967 | Sammarco | 239—664 |
| 2,676,002 | 4/1954 | Wolfe | 239—664 X |

FOREIGN PATENTS 969,386  9/1964  Great Britain.

M. HENSON WOOD, JR., Primary Examiner

M. Y. MAR, Assistant Examiner

U.S. Cl. X.R.

222—301; 239—666, 688